United States Patent [19]

King et al.

[11] Patent Number: 5,581,731

[45] Date of Patent: *Dec. 3, 1996

[54] METHOD AND APPARATUS FOR MANAGING VIDEO DATA FOR FASTER ACCESS BY SELECTIVELY CACHING VIDEO DATA

[76] Inventors: Edward C. King, 4945 Norris Rd., Fremont, Calif. 94536; John M. Adams, 6313 Vail Cir., Colorado Springs, Colo. 80919

[*] Notice: The terminal 9 months of this patent has been disclaimed.

[21] Appl. No.: 323,420

[22] Filed: Oct. 14, 1994

Related U.S. Application Data

[63] Continuation of Ser. No. 38,562, Mar. 26, 1993, abandoned, which is a continuation of Ser. No. 752,759, Aug. 30, 1991, abandoned.

[51] Int. Cl.⁶ .................................................. G06F 12/08
[52] U.S. Cl. .................... 395/471; 364/DIG. 1; 364/DIG. 2; 364/243.41; 395/490; 395/465
[58] Field of Search ........................... 364/200 MS File, 364/900 MS File; 345/185; 395/465, 471, 490, 403, 440

[56] References Cited

U.S. PATENT DOCUMENTS

| | | | |
|---|---|---|---|
| 5,012,407 | 4/1991 | Finn | 395/700 |
| 5,014,125 | 5/1991 | Pocock et al. | 358/86 |
| 5,043,919 | 8/1991 | Callaway et al. | 395/157 |
| 5,045,998 | 9/1991 | Begun et al. | 395/325 |
| 5,060,136 | 10/1991 | Furney et al. | 395/425 |
| 5,091,850 | 2/1992 | Culley | 395/400 |
| 5,095,424 | 3/1992 | Woffinden et al. | 395/425 |
| 5,129,090 | 7/1992 | Bland et al. | 395/725 |
| 5,179,651 | 1/1993 | Taaffe et al. | 395/154 |
| 5,208,908 | 5/1993 | Harrison et al. | 395/150 |
| 5,222,205 | 6/1993 | Larson et al. | 395/130 |
| 5,263,136 | 11/1993 | DeArguiar et al. | 395/164 |
| 5,270,832 | 12/1993 | Balkanski et al. | 358/432 |
| 5,276,851 | 1/1994 | Thacker et al. | 395/425 |

*Primary Examiner*—Matthew M. Kim

[57] ABSTRACT

A method and apparatus for decreasing computer fetch time utilizes cache memory to store video data when the data is not modified by a write modifier. The video controller signals the cache controller over a control line whether the data will be modified. The data which is not modified is written to the cache memory and may be read from the cache memory when further processing is needed.

15 Claims, 3 Drawing Sheets

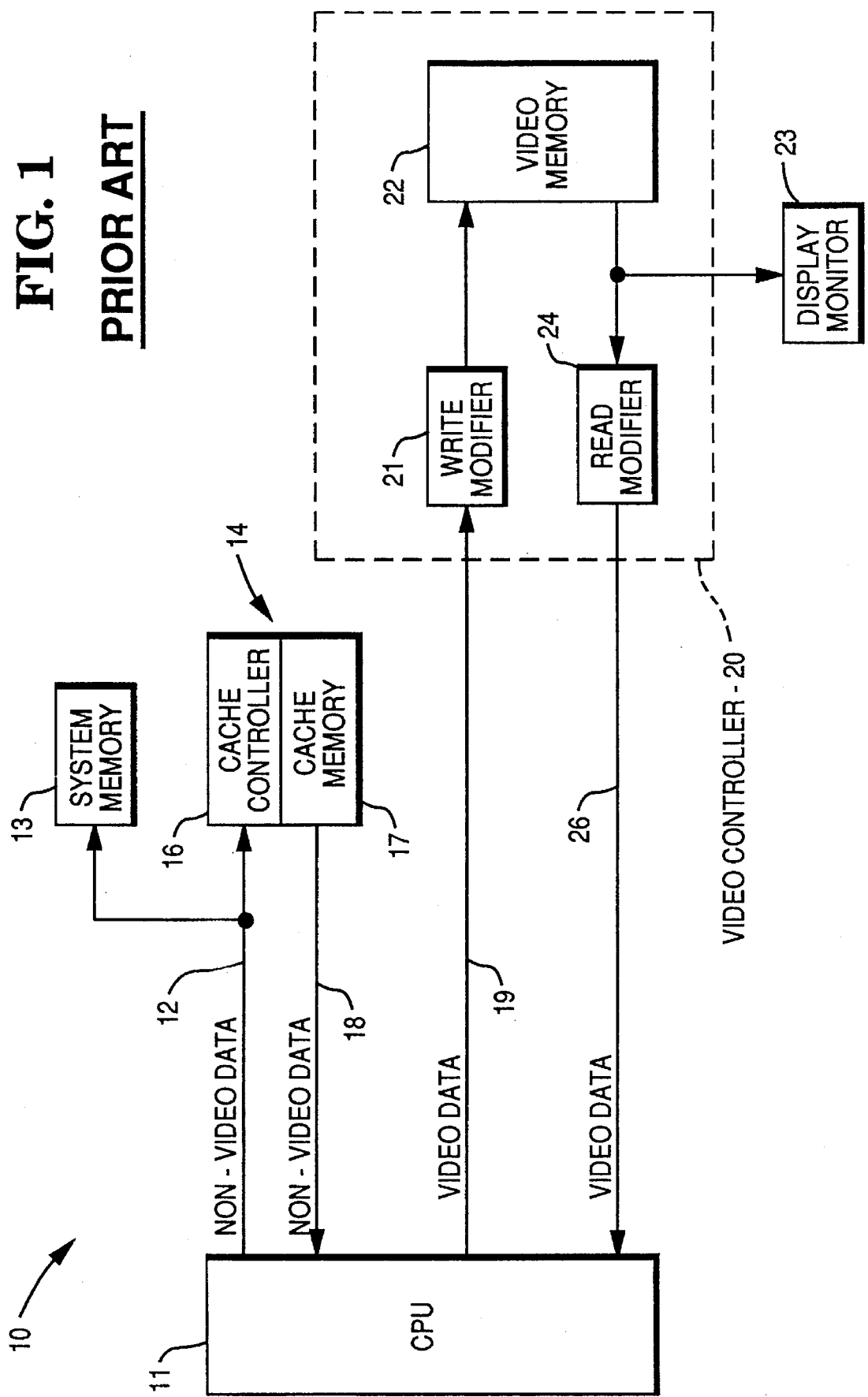

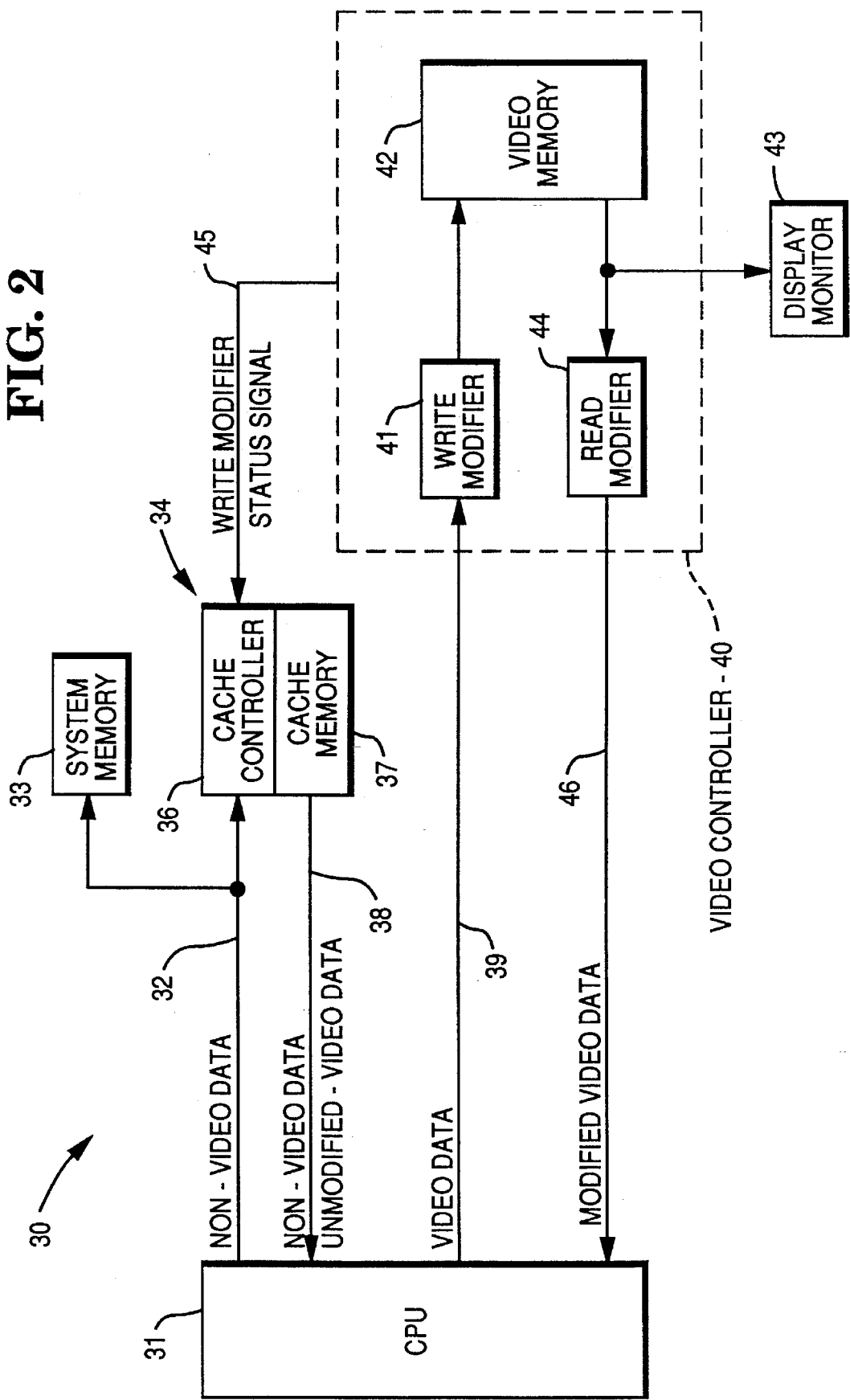

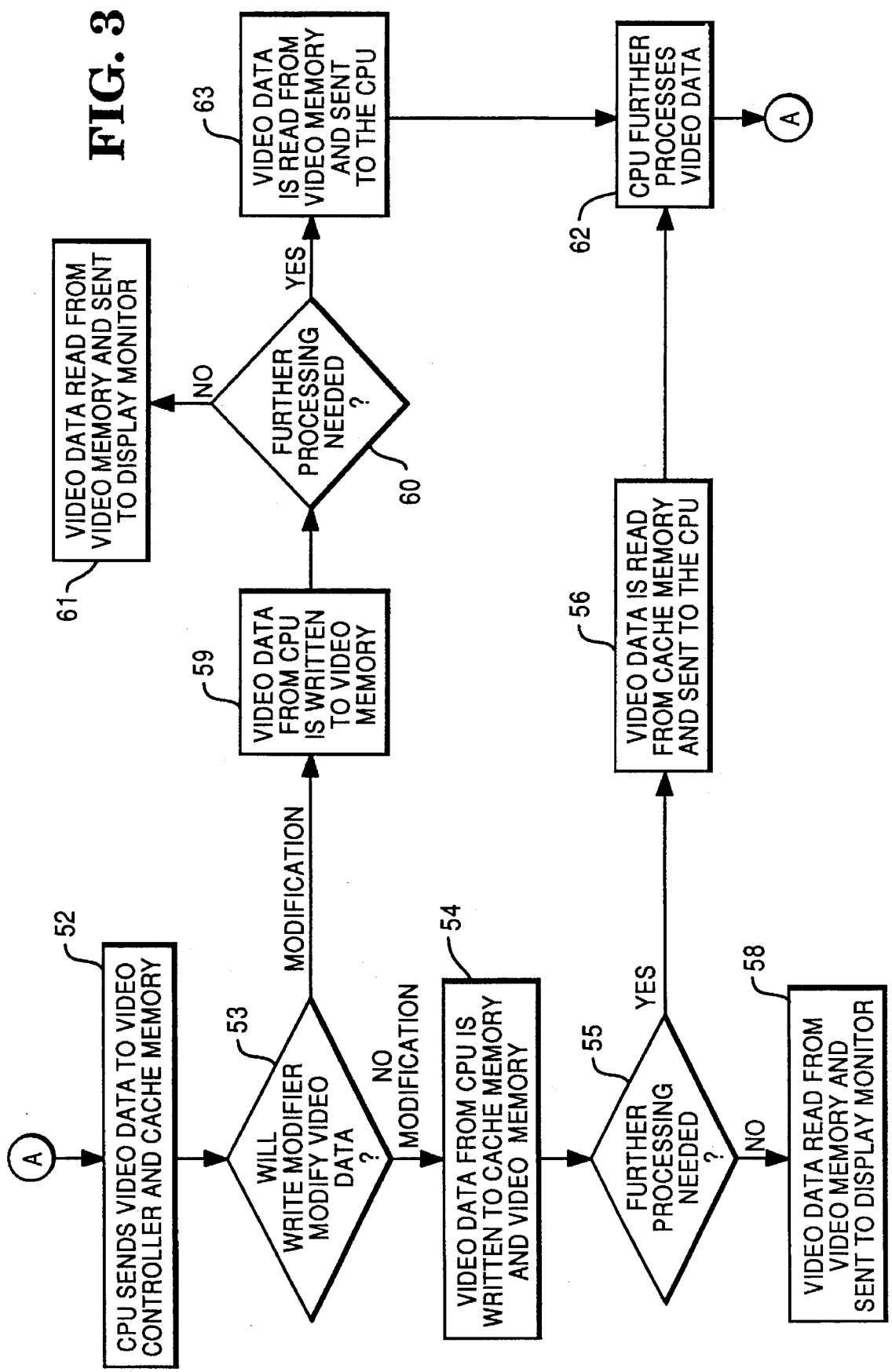

METHOD AND APPARATUS FOR MANAGING VIDEO DATA FOR FASTER ACCESS BY SELECTIVELY CACHING VIDEO DATA

This is a continuation application Ser. No. 08/038,562, filed Mar. 26, 1993, now abandoned, which is a continuation of co-pending application Ser. No. 07/752,759 filed on Aug. 30, 1991, now abandoned.

BACKGROUND OF THE INVENTION

The present invention relates to methods and apparatus for decreasing computer fetch time. More particularly, the present invention relates to methods and apparatus for writing video data from a central processing unit (CPU) of a computer to cache memory, and reading that video data from cache memory.

DESCRIPTION OF THE STATE OF THE RELEVANT TECHNOLOGY

In recent years, the use of high speed cache memory in personal computers/personal workstations has increased as designers have attempted to better utilize the speed of high speed processors such as the Intel 80386 and 80486. The cache memory is used as a buffer to store an identical copy of system memory instructions so that subsequent reads can be made from the high speed cache memory, rather than from the relatively flow system memory.

The caching of such non-video data is illustrated in FIG. 1, which is a schematic depiction of the relevant portion of an exemplary prior art computer system 10 that includes, in part, a central processor 11, system memory 13 and a cache 14 comprising cache controller 16 and cache memory 17. Non-video data which can be stored in the cache memory 17 is written to both the system memory 13 and the cache memory 17. When non-video data which has been cached requires further processing, that data is retrieved from the cache memory 17 and is transmitted to the processor 11. This use of the high speed cache memory reduces overall fetch time, thus reducing the total time the computer spends processing data.

Because video memory is often mapped within the system memory address space (for example, in video graphics array (VGA) video systems), it would be advantageous to cache the video data in the high speed cache memory, in addition to the usual storage in the relatively slow video memory. However, caching has not been used for video memory; the reasons are illustrated by the operation of the exemplary FIG. 1 computer system 10.

In the prior art system 10, video data is transmitted via line 19 to video controller 20 where it sometimes undergoes transformation by write modifier 21 before being written to video memory 22. (For example, the position of the data may be shifted for pixel alignment.) If the original, unmodified video data had been written to the cache memory 17 as well as to the video memory 22, the data in the cache would no longer be identical to the modified data in video memory and, thus, would be unusable. In short, prior art systems such as 10 cannot utilize high-speed cache memory to reduce fetch time and thereby effect increased overall computer performance. This is unfortunate because, typically, the read time for video memory is considerably longer than that for cache memory and, thus, storing video data in cache memory would decrease overall fetch time considerably.

SUMMARY OF THE INVENTION

Objects

It is one primary object of our present invention to provide methods and apparatus for reducing computer fetch time (the time required to retrieve data from memory), thereby increasing the computer's processing speed.

It is a related object of our present invention to cache video data that requires further processing by a processor.

It is another related object of our present invention to cache video data that is not modified by a write modifier and also requires further processing by the processor.

Summary

In one aspect, our invention which achieves the above and other objectives is embodied in a method of caching video data in a computer system, comprising sending from a video controller to a cache controller, write modifier status signals indicating whether a write modifier associated with video memory will modify selected video data stored in a system processor; and in response to a write modifier status signal indicating the selected video data will not be modified, writing the selected video data at least to the cache memory.

If the unmodified video data requires further processing by the processor, that data may be read from the high speed cache memory, instead of the relatively slow video memory, and sent to the processor.

Also, unmodified video data written to the cache memory may be written to system video memory, preparatory to being transmitted to a display.

In another aspect, our method comprises: sending to a cache controller of a computer system write modifier status signals indicating whether a write modifier associated with video memory of the computer system will modify video data written to the video memory from a system processor; selectively storing video data sent from the processor (a) in the cache memory upon reception at the cache controller of a write modifier status signal signifying no video data modification and (b) in the video memory upon the reception at the cache controller of a write modifier status signal signifying video data modification; and returning the stored video data to the processor.

In yet another aspect, our invention is embodied in a computer system which comprises a processor connected to a high speed memory and video controller, and a control line connecting the controller to the memory for selectively enabling the transfer of video data from the processor to the memory. In another aspect, the controller includes a write modifier and video memory series connected between the processor and a display monitor. Also, in yet another aspect, the system is configured so that high speed memory is enabled in response to a signal from the write modifier that said selected video data will not be modified.

In still another aspect, our invention is embodied in a computer system for selectively processing video data using cache memory, comprising: a video controller including video memory and a write modifier for selectively modifying video information as it is written to the video memory; cache memory; a cache controller for controlling the writing of video data to the cache memory upon receipt by the cache controller of a signal indicating that video data will not be modified when written to the video memory; and a processor for transmitting video data to the video memory and to the cache memory, and receiving video data from the video memory and the cache memory for further processing. The video controller is adapted to apply a write modifier status signal to the cache controller indicating when video data from the processor will not be modified by the write modifier, so that the cache controller will write that video data to the cache memory, thereby permitting retrieval of the video data by the processor.

BRIEF DESCRIPTION OF THE DRAWINGS

The above and other aspects of our present invention are described with respect to the drawing, in which:

FIG. 1 is a simplified schematic depiction of the relevant portion of a prior art computer system;

FIG. 2 is a simplified schematic depiction, in the manner of FIG. 1, of a computer System which embodies our present invention and enables the caching of video data; and FIG. 3 is a flow chart illustrating a preferred method for caching and processing video data in accordance with our present invention.

DETAILED DESCRIPTION OF THE PREFERRED EMBODIMENT(S)

1. Overview of Preferred Apparatus And Operation (FIG. 2)

FIG. 2 is a simplified schematic drawing of a presently preferred embodiment 30 of our computer system, which selectively caches video data in cache 34.

System 30 has the capability of prior art systems such as the system 10, FIG. 1, in that selected non-video data may be transmitted from the CPU 31, illustratively via line 32, and written to both the system memory 33 and to the cache memory 37, then retrieved from the cache memory 37 via line 38 for further processing. Also, video data may be transmitted via line 39 from the CPU 31 to the video controller 40 and may be modified by the write modifier 41 prior to storage in the video memory 42. Ultimately, the video data is read from the video memory 42 and transmitted to the monitor 43 for display. When further processing is required, the video data is transmitted via read modifier 44 and over line 46 to the CPU 31 for the further processing, then returned to the video memory 42 preparatory to transfer to the monitor 43.

Unlike the prior art systems, our system 30 has the ability to selectively cache video data. That is, if the video data will be modified by the write modifier 41, it is written only to the video memory 42. However, if the video data will not be modified, it is written to the cache memory 37 (as well as to the video memory 42). Because only that video data which does not require modification is written to the cache memory 37, the video data stored therein can be retrieved and used without difficulty. The retrieval from cache memory requires substantially less time than would retrieval from video memory or from system memory. Thus, this selective use of cache memory avoids the problems inherent in the prior art and permits taking advantage of the high speed retrieval capability of cache memory and of the associated potential for increasing the overall speed with which video data is processed by the computer system. These advantages are obtained without complex or complicated hardware modifications.

2. Write Modifier Status Signal Operation

The selective caching of the video data is controlled by a write modifier status signal, preferably generated by the write modifier 41 and transmitted to the cache controller 36. This transmission can be effected by a hard wire connection 45 between the write modifier 41 and the cache controller 36, or by other suitable means. The write modifier signal preferably consists of a one bit character which signals the cache controller whether the write modifier 41 will modify incoming video data from the CPU 31.

No Data Modification

If the selected data will not be transformed or modified by the write modifier 41 (e.g., where a VGA monitor is operating in the alphanumeric mode), the write modifier 41 generates the appropriate write modifier status signal, which in the case of a one bit character is either a zero or one. This "no modification" write modifier status signal causes the cache controller 36 to instruct the cache memory 37 to write the incoming video data. Consequently, the video data is transmitted from the CPU 31 via line 39 and is written, unmodified, to both the cache memory 37 and the video memory 42.

If the unmodified video data is to be processed further before it is transferred to the monitor 43, it is read from the high-speed cache memory 37 and sent to the CPU 31, illustratively over the same transmission line(s) 38 used for the transmission of nonvideo data.

Data Modification

If the write-modifier 41 will modify data (for example, for pixel alignment), the write modifier 41 generates the appropriate "modification" write modifier status signal, which is applied via line 45 to the cache controller 36. In turn, the cache controller instructs the cache memory 37 not to write the associated incoming video data. In this manner, the video data transmitted over line 39 will be written, via the write modifier 41, only to the video memory 42. Subsequently, the modified data in the video memory 42 may be retrieved by the CPU 31 via line 46 for further processing or may be transmitted to the monitor 43 for display.

3. Summary of Preferred Method of Operation (FIG. 3)

The FIG. 3 flow chart depicts an operational sequence of the FIG. 2 embodiment of our invention. In the following discussion, the elements of the flow chart (the steps of the method) are identified by parenthetical reference numerals.

Starting at A, the CPU 31 transmits the selected video data to the cache memory 37 and to the video controller 40 (52).

If the selected video data is not to be modified by the write modifier 41 (53), as indicated by a "no modification" write modifier status signal to the cache controller 36 (53), the video data from the CPU 31 will be written to both the cache memory 37 and to the video memory 42 (54). Where further processing is unnecessary (55), the video data is now ready to be read from video memory 42 and sent to the display monitor 43 (58). Where further processing is needed (55), the video data is read from the cache memory 37 and transmitted to the CPU 31 (56). The CPU 31 processes the data (62) and transmits the processed data to the video controller 40 and to the cache memory 37 (A), preparatory to repetition of the process.

If the selected video data will be modified by the write modifier 41 (53), as signalled by the "modification" write modifier status signal, the video data is written only to the video memory 42 (59). If further processing is unnecessary (60), the modified data is ready to be read from video memory 42 and sent to the display monitor 43 (61). If further processing is required (60), the video data is read from the video memory 42 and sent to the CPU 31 (63). The CPU 31 processes the data (62) and returns the processed data to the video controller 40 and to the cache memory 37 (52).

Having thus described preferred embodiments of my invention, it will be appreciated that those of usual skill in the art will readily modify and extend the described invention based upon the scope of the disclosure here and within the scope of the following claims.

We claim:

1. A method of caching video data in a computer system which includes a processor for sending the video data, a cache connected to the processor for caching the video data, a video memory and a write modifier connected to the processor and the cache, the method comprising the steps of:

(a) determining whether the write modifier will modify the video data sent by the processor;

(b) in response to the determination that said video data will not be modified, writing said video data as unmodified video data to both the cache and video memory; and (c) in response to the determination that said video data will be modified, writing said video data as modified video data to the video memory, and prohibiting said modified video data from being written to said cache memory.

2. The method of claim 1, further including the step of (c) returning said unmodified video data written to the cache, to the processor.

3. A method of caching video data in a computer system which includes a processor for sending the video data; a cache connected to the processor for caching the video data; a video memory; a write modifier connected to the video memory, to the cache and to the processor; the method comprising the steps of:

(a) providing a write modifier status signal indicating whether the write modifier will modify the video data sent by the processor;

(b) in response to the write modifier status signal indicating said video data will not be modified, writing said video data as unmodified video data to both the cache and video memory; and (c) in response to the write modifier status signal indicating said video data will be modified, writing said video data as modified video data to the video memory, and prohibiting said modified video data from being written to said cache memory.

4. The method of claim 3, further including the step of (c) returning said unmodified video data written to the cache, to the processor.

5. A method of caching video data in a computer system comprising processor for sending the video data; a cache memory connected to the processor; a cache controller connected to the cache memory; a video memory; a write modifier connected to the video memory for modifying the video data, the method comprising the steps of:

(a) when the video data sent by the processor is to be modified,
   (i) writing the video data from the processor via the write modifier to the video memory for storage therein as modified video data, and
   (ii) prohibiting said modified video data from being written to said cache memory; and (b) when the video data sent by the processor is not to be modified,
   (i) sending a first write modifier status signal from the write modifier to the cache controller indicating the write modifier will not modify video data sent from the processor to the video memory and writing said video data from the processor to said video memory as unmodified video data, and
   (ii) writing said video data from the processor to the cache memory as unmodified video data only upon reception of at the cache controller of said first write modifier status signal.

6. The method of claim 5, further comprising the step of: when unmodified video data is stored in said video memory, sending said unmodified video data from said video memory to a display.

7. The method of claim 5, further comprising the step of: when unmodified video data is stored in the cache memory, returning said unmodified video data from the cache memory to the processor.

8. A method of caching video data in a computer system comprising a processor for sending the video data; a cache memory connected to the processor; a cache controller connected to the cache memory; a video memory; a write modifier connected to the video memory for modifying the video data, the write modifier connected to the cache controller, and the write modifier connected to the processor, the method comprising the steps of:

(a) when the video data sent by the processor is to be modified, sending video data from the processor via the write modifier to the video memory for storage therein as modified video data;

(b) when the video data sent by the processor is not to be modified,
   (i) sending a first write modifier status signal from the write modifier to the cache controller indicating the write modifier will not modify video data sent from the processor to the video memory and sending said video data from the processor to said video memory for storage therein as unmodified video data,
   (ii) writing said video data from the processor to the cache memory for storage therein as unmodified video data only upon reception of at the cache controller of said first write modifier status signal; and (c) when unmodified video data is stored in the cache memory, returning said unmodified video data from the cache memory to the processor; and (d) on reception at the cache controller of a second write modifier status signal indicating the write modifier will not modify the video data returned to the processor, transmitting the unmodified returned video data from the processor to the cache memory.

9. A computer for processing video data, the computer comprising:

(a) a processor for sending the video data;

(b) a video controller connected to the processor, said video controller including:
   a video memory for storing video data sent by the processor, and
   a modifier connected between the video memory and the processor for selectively modifying said video data sent by the processor before said video data is stored into said video memory;

(c) a cache memory connected to the processor for storing said video data sent by the processor;

(d) means, if said video data is not to be modified by said modifier, for writing said video data as unmodified video data into both said video memory and cache memory; and (e) means, if said video data is to be modified by said modifier, for writing said video data as modified video data into said video memory and for prohibiting the modified video data from being written into said cache memory.

10. The computer of claim 9, wherein said processor is able to receive the unmodified video data from said cache memory.

11. The computer of claim 10, wherein said cache memory is able to store non-video data, and said processor is able to receive the unmodified video data and non-video data from said cache memory.

12. A computer system for storing video and non-video data in cache memory to facilitate processing, comprising:

a processor, a single video controller including a video memory for storing the video data, a cache including cache memory for storing non-video and video data, a cache controller, and a write modifier;

a system memory for storing non-video data;

the write modifier for selectively modifying the video data as the video data is written to the video memory by the processor, the write modifier being connected to the video memory for modifying video data written to the video memory by the processor, and the video controller being connected to the cache controller for sending a write modifier signal to the cache controller indicating when video data will not be modified by the write modifier;

the processor connected to the system memory for transmitting non-video data to and receiving non-video data from the system memory, the processor connected to the video controller for transmitting video data to and receiving video data from the video controller, and the processor connected to the cache; and the cache controller being connected to the cache memory for controlling writing of the video data from the processor to the cache memory upon receipt of said write modifier status signal, said video controller thereby permitting storage of unmodified video data in the cache memory and retrieval of the unmodified video data from the cache memory for processing by the processor.

13. A computer for processor video data, the computer comprising:

(a) a processor for sending the video data;

(b) a video controller connected to the processor, said video controller including:

a video memory for storing the video data sent by the processor, and a modifier connected between the video memory and the processor for selectively modifying said video data sent by the processor before said video data is stored into said video memory;

(c) cache memory connected to the processor for storing said video sent by the processor;

(d) means for providing a first state if said video data will be modified by said modifier, and for providing and a second state if said video data will not be modified by said modifier;

(e) means, responsive to said first state, for writing said video data as unmodified video data into both said video memory and cache memory; and (f) means, responsive to said second state, for writing said video data as modified video data into said video memory and for prohibiting said modified video data from being written into said cache memory.

14. The computer of claim 13, wherein said processor is able to receive the unmodified video data from said cache memory.

15. The computer of claim 14, wherein said cache memory is able to store non-video data, and said processor is able to receive the unmodified video data and non-video data from said cache memory.

* * * * *